Jan. 26, 1937.   W. J. DE WITT   2,068,849
EYESHIELD
Filed Oct. 30, 1934
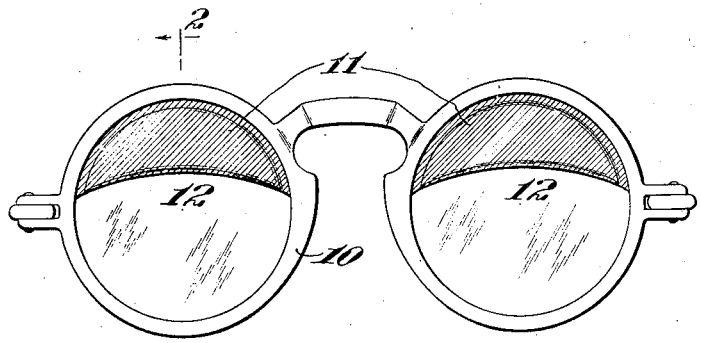
Fig.1
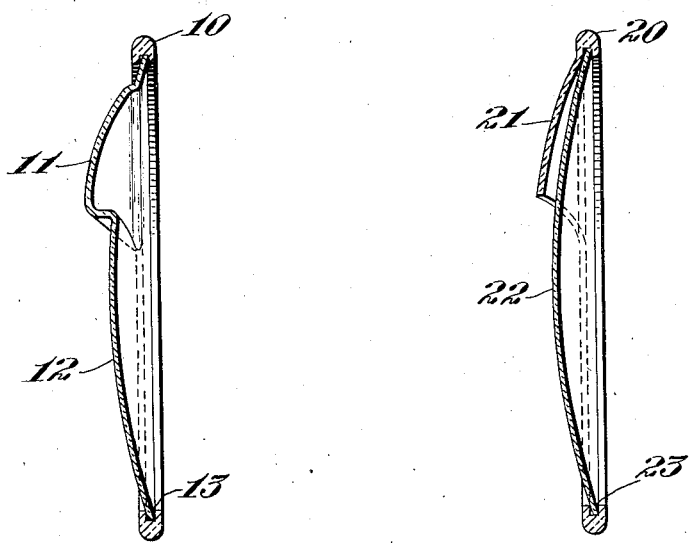 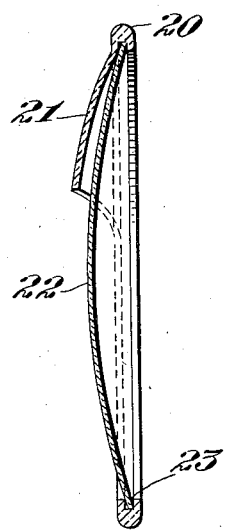
Fig.2    Fig.3
Inventor
William J. DeWitt
by Roberts, Cushman & Woodbury,
att'ys.

Patented Jan. 26, 1937

2,068,849

UNITED STATES PATENT OFFICE 2,068,849

EYESHIELD

William J. De Witt, Auburn, N. Y., assignor to Shoe Form Co., Inc., Auburn, N. Y., a corporation of New York Application October 30, 1934, Serial No. 750,659

1 Claim. (Cl. 2—12)

This invention relates to an improvement in eye shields adapted to be worn to shield the eyes from the glare of the sun, of automobile headlights and other sources of light.

The primary object of this invention is the provision of such shield with a darkened visor portion which prevents the entry of the direct rays of the sun or other source of light.

A further object of this invention resides in the formation of such shields which comprises as elements a frame, a visor and a lens, two of such elements being integral.

These and other objects of the invention will appear from a consideration of the following description and of the accompanying drawing which forms a part thereof and in which Fig. 1 is a view in front elevation of goggles embodying one form of this invention;

Fig. 2 is an enlarged cross-sectional view of one eye piece taken along the line 2—2 on Fig. 1; and Fig. 3 is a view similar to Fig. 2 of the eye piece of shields embodying another form of this invention.

The invention is shown applied to goggles but it will be understood that it is not limited thereto and that it may be applied to eye shields of other types if desired.

The goggles shown in Figs. 1 and 2 comprise a frame 10, having separate eye pieces, in each of which are mounted a visor 11 and lens 12. As shown in Fig. 2, two of these three elements, to wit, the visor 11 and lens 12, are integral, forming a unit the edges of which enter the groove 13 with which each eye piece is provided. The frame 10 and the visor and lens unit are made of celluloid or other moldable material. The celluloid forming the visor and lens unit is transparent and suitably molded so that the visor 11 is offset from the lens 12. The celluloid forming the lens is preferably rendered slightly opaque, being tinted blue, green, brown or other color so as to shield the eyes from reflected light without materially impairing the vision. If desired, however the celluloid may be clear. Vision is through the lens alone, the visor being materially darkened as indicated on Fig. 1 so that it is substantially opaque and shields the eyes from direct rays of light.

The embodiment shown in Fig. 3 differs from that just described in that two of the elements, the frame 20 and visor 21, are integral and the lens 22 is a separate element the edges of which enter the groove 23. The visor 21 is darkened like the visor 11 and for the same reason.

While two embodiments of this invention have been shown and described, it will be understood that I am not limited thereto and that other embodiments may be made without departing from the spirit and scope of the invention as set forth in the following claim.

I claim:

An eye shield of the class described comprising a frame, a lens and a visor, the lens and visor merging into a single integral unit carried by the frame, the merging being along a line substantially above the horizontal center of the shield, the lens being below and the visor being above that line, and the visor being substantially opaque and offset from the lens whereby vision is through the lens alone and the visor serves to shield the eye from direct rays of light.

WILLIAM J. DE WITT.